(No Model.)
A. J. MAGINNIS.
STEAM STEERING GEAR FOR VESSELS.
No. 334,593. Patented Jan. 19, 1886.
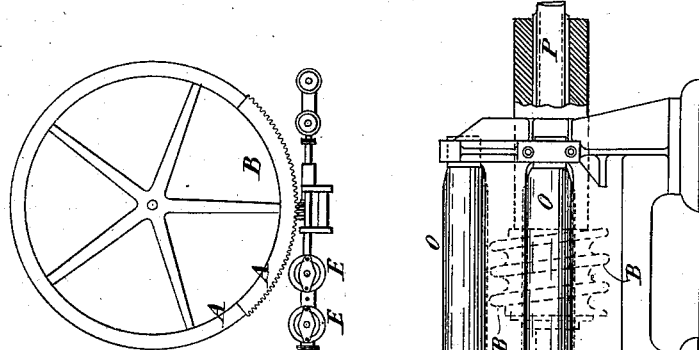
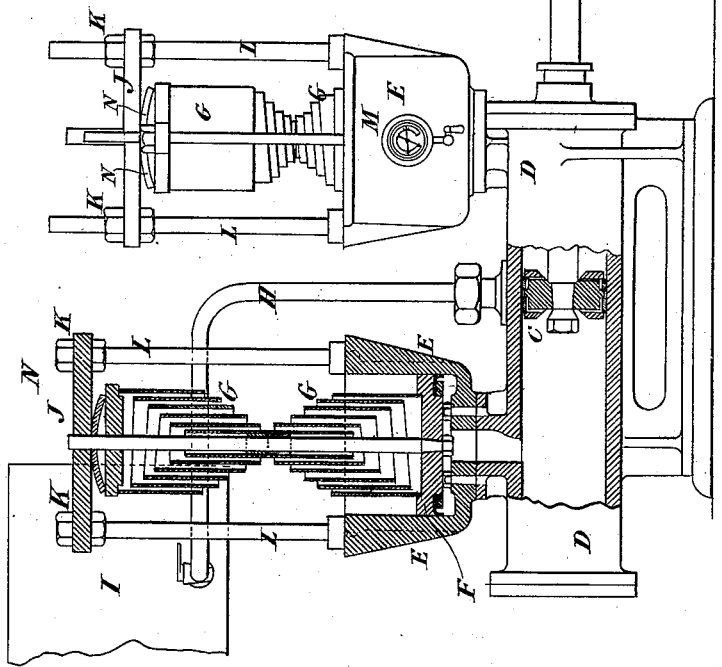
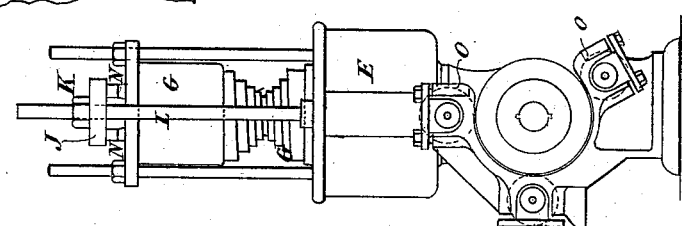
Witnesses
Baltus DeLong
Allan McLane Abert
Inventor
Arthur John Maginnis
By attorneys
Baldwin, Hopkins & Peyton

UNITED STATES PATENT OFFICE.

ARTHUR JOHN MAGINNIS, OF LIVERPOOL, ENGLAND.

STEAM STEERING-GEAR FOR VESSELS.

SPECIFICATION forming part of Letters Patent No. 334,593, dated January 19, 1886.

Application filed November 23, 1885. Serial No. 183,772. (No model.)

*To all whom it may concern:*

Be it known that I, ARTHUR JOHN MAGINNIS, a subject of the Queen of Great Britain, residing at 51 Hartington Road, Sefton Park, Liverpool, England, member of the Institution of Naval Architects, have invented certain new and useful Improvements in Steam Steering-Gear, of which the following is a specification.

This invention has mainly for its object to apply a small ordinary two-cylinder or other type of steam-engine to give motion directly to the quadrant or tiller on the rudder-head, and thereby do away with the existing noisy system of chains, wire ropes, or such like, and economize space very largely. This I effect by means of a worm on the driving-shaft of the engine, made to gear with the teeth of a toothed arc which can easily be attached to any existing "quadrant" or tiller. To prevent breakage of the teeth of the toothed arc and to ease the whole gear from the strains caused by a heavy sea or any other object striking the rudder, I make the worm capable of sliding endwise along the driving-shaft and couple the worm to spring or buffer mechanism, which allows it to yield in either direction whenever excessive strain comes upon the rudder, and brings it back to its normal position so soon as the excessive strain is relieved. For this purpose I prefer to employ a piston fixed on the axis of the worm and made to work in a cylinder, which I call the "cushion-cylinder," filled with glycerine or oil or other liquid. To each end of this cushion-cylinder I connect a regulating-cylinder, each fitted with a hydraulic piston, the bottom side of which rests against the liquid with which the cushion-cylinder is filled, and the top side is loaded with a powerful spring. The diameter of these cylinders is so proportioned as to give sufficient area for the spring-pressure upon the pistons to sustain the thrust of the piston of the cushion-cylinder, to which the worm is attached, when the helm is hard over to either side and the ship going full speed. This spring-pressure being adjusted, it is obvious that if any greater strain is put upon the rudder by a blow or otherwise it will yield to it as far as the cushion-cylinder will allow the worm to travel. As the piston of one regulating-cylinder is so forced upward by the strain on the rudder, the piston of the other regulating-cylinder is forced downward by the pressure of the spring upon it until after a very short travel it rests against the bottom of the cylinder, and as the pressure is maintained on the forced-up piston, it will give an elastic resistance, which, if the pressure upon the rudder still further increases, will allow the worm-piston to travel over to where it cuts off the opening to the regulating-cylinder. In order to avoid the vacuum which would otherwise be created on the back side of the worm-piston in the cushion-cylinder, and to insure the worm always returning to its central position, it is allowed to fill with liquid through a small opening in the cylinder, which is opened by the endwise movement of the piston within it.

When the pressure on the rudder is relieved, the pressure of the compressed springs in the regulating-cylinder again forces back the piston of the cushion-cylinder and the worm fixed to it to its normal position, the excess of liquid in the cushion-cylinder being then forced out through the opening above mentioned until the piston of the cushion-cylinder again closes the opening, after which the pressure in the one regulating-cylinder balances the pressure in the other regulating-cylinder, and the parts are held in their normal position.

The piston of the cushion-cylinder I make with a central conical hollow in each of its ends. I also provide the piston with two sets of packing-rings fitted with leather tongue-pieces, and from one hollow lead passages to the back of one set of rings and from the other hollow to the other set of rings.

Any ordinary arrangement of gear for controlling the movement of the steam-engine to cause it to drive the worm in the one direction or the other, as required, may be adopted. The arrangement shown in the drawings is very suitable for the purpose.

Figure 1 is a side elevation, partly in section, of steam steering-gear arranged as above described. Fig. 2 is an end elevation of the same. Fig. 3 is a diagram plan view of the steering-gear on a smaller scale.

A is the toothed arc on the tiller or quadrant; B, the worm gearing therewith; C, a piston fixed on the axis of the worm; D, the cushion-cylinder; E E, the regulating-cylinders, one at each end of the cushion-cylinder.

F F are the pistons working in the regulating-cylinders. G G are powerful springs made to bear upon the top of these pistons.

H is a pipe leading from the center of the cylinder D to a reservoir of liquid, I.

The springs I use for bearing upon the pistons F are volute springs, as shown. The upper spring of each pair of springs bears against an abutment, J, which can be set nearer to or farther from the pistons by turning the nuts K, which screw onto the rods L. The pressure put upon the springs can be indicated by pressure-gages M, connected with the cylinders E. In addition to using the strong volute springs G, I also use secondary springs, N, for light cushioning when the rudder is in its central position and to insure elasticity.

To support the worm as it is moved endwise in one direction or the other, and to keep it from springing away from the toothed arc A, I use a roller-bearing composed of three parallel rollers, O, mounted in fixed bearings. One roller supports the worm on the side opposite to that which gears with the toothed arc; the other rollers support it on its upper and under sides, as shown at Fig. 2.

I do not restrict myself to the precise construction of spring-buffer mechanism hereinbefore described for keeping the worm in its normal position, so long as no excessive strain comes upon the rudder, as it will be obvious that various other ways of applying spring-buffers to the axis of the worm to effect this object might be adopted.

The end of the worm-axis which is driven from the steam-engine is made hollow, as shown at Fig. 1. The end of the crank-shaft P of the engine passes into it, and keys secured lengthwise of the shaft enter corresponding grooves or keyways cut along the interior of the hollow worm-axis.

Any ordinary construction of steam-engine used in steam steering-gear may be employed for giving movement to the shaft P.

I claim—

1. The combination of the worm, which can move endwise and also be rotated, the toothed arc into which the worm gears, and which is attached to the quadrant or tiller of a rudder, and spring or buffer mechanism, which allows the worm to move endwise whenever excessive strain comes on the rudder and brings it back to its normal position so soon as the excessive strain is relieved, substantially as described.

2. The combination of the toothed arc attached to the quadrant or tiller of a rudder, the worm gearing therewith, and also capable of endwise movement, the piston on the axis of worm working in a control-cylinder filled with liquid, and the regulating-cylinder at each end of control-cylinder fitted with a piston pressed inward by a powerful spring, substantially as described.

3. The combination of the toothed arc A, the worm B, the roller-bearing O, for supporting the worm, the piston C on the axis of the worm, the cylinder D, with opening H at its center for supply of liquid, and the cylinders E, fitted with pistons F, pressed inward by springs G, substantially as described.

ARTHUR JOHN MAGINNIS.

Witnesses:
  CHARLES ALOYSIUS MARIA LIGHTBOUND,
        *Notary Public, Liverpool.*
  ALEXANDER HYSLOP MAXWELL,
    *Clerk with Messrs. Hill, Dickinson, Lightbound & Dickinson, Solicitors, Liverpool.*